Figure 1:
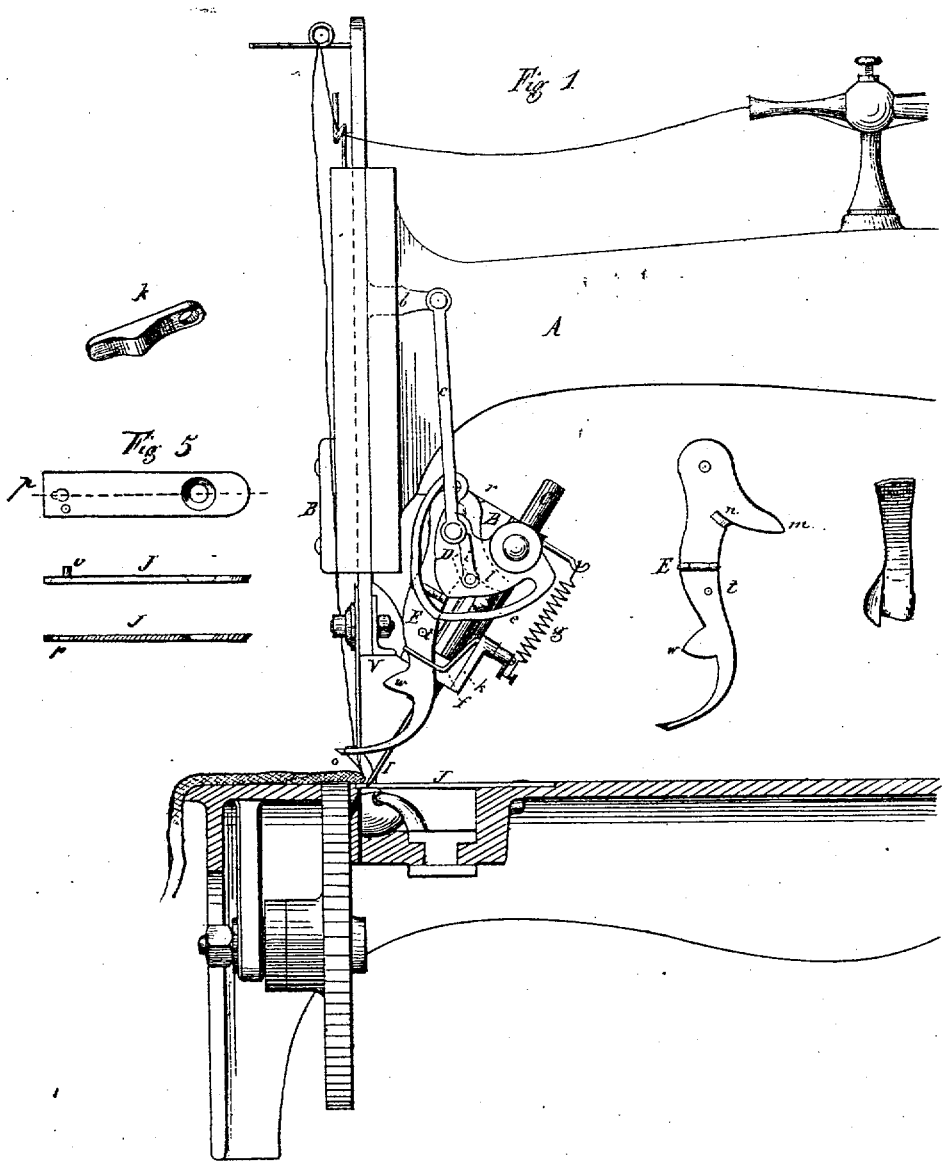

BEST AVAILABLE COPY BEST AVAILABLE COPY

2 Sheets--Sheet 1.

E. HOWARD & W. H. JACKSON.

Button-Holing and Overseaming Attachments for Sewing-Machines.

No. 5,728. Reissued Jan. 13, 1874.

Witnesses.
Geo. H. McGrew.
Jenne E. Knox.

Inventors
Edmund Howard
William H. Jackson
by J. E. Maynadier
their atty

A.M. PHOTO-LITHOGRAPHIC CO. N.Y. (OSBORNE'S PROCESS)

2 Sheets--Sheet 2.

E. HOWARD & W. H. JACKSON.

Button-Holing and Overseaming Attachments for Sewing-Machines.

No. 5,728. Reissued Jan. 13, 1874.

Witnesses.

Geo. H. McGrew.

J. E. Knox.

Inventors.

Edmund Howard

William H. Jackson by J. E. Mayerdier their atty.

AM. PHOTO-LITHOGRAPHIC Co. N.Y. (OSBORNE'S PROCESS)

UNITED STATES PATENT OFFICE.

EDMUND HOWARD, OF FLUSHING, AND WILLIAM H. JACKSON, OF BROOKLYN, NEW YORK, ASSIGNORS, BY MESNE ASSIGNMENTS, TO HENRY E. TOWNSEND, CHARLES P. BRIGHAM, AND GEORGE W. SIMMONS, OF BOSTON, MASSACHUSETTS.

IMPROVEMENT IN BUTTON-HOLING AND OVERSEAMING ATTACHMENTS FOR SEWING-MACHINES.

Specification forming part of Letters Patent No. 103,745, dated May 31, 1870; reissue No. 5,728, dated January 13, 1874; application filed February 12, 1873.

*To all whom it may concern:*

Be it known that we, EDMUND HOWARD, of Flushing, Queens county, and WILLIAM H. JACKSON, of Brooklyn, Kings county, in the state of New York, have invented certain Improvements in Sewing-Machines, of which the following is a specification:

Our invention relates to the mechanism for looping the under thread of sewing-machines over the edge of the fabric, and is an improvement upon that heretofore patented to us.

The principle of our present attachment is the same as that of the attachment described in our Letters Patent No. 69,671, dated October 8, 1867, so far as causing the device for catching the under thread to form a part of the throat of the machine is concerned, and the same as that of the attachment described in our Letters Patent No. 94,212, dated August 31, 1869, so far as using an eye, instead of a hook, for this device is concerned; and our present invention consists in certain improvements upon those attachments, mostly in matters of detail.

The bed-piece B, to which the mechanism is attached, is secured to the overhanging arm by clamps, so as to bring the mechanism in proper relation to the needle and throat of the machine. The under-thread catcher forms part of the throat of the machine, as fully described in our former patents, but moves diagonally towards the path of the needle, instead of, as in our former attachments, nearly at right angles thereto. This under-thread catcher is the blunt needle I, with an elongated eye at its lower end, and is secured in the reciprocating slide C, mounted on the bed-piece B. The needle I is operated by a slotted cam, D, pivoted on the side of the bed-piece B, and actuated by a link, *c*, connected to the needle-bar or the needle-arm, a pin, *e*, on the slide C entering the slot in the cam D. As the sewing-needle begins its downward movement the cam D moves the slide C downward, carrying with it the needle I, which arrives in position first, with its elongated eye directly under the point of the sewing-needle, which descends and passes through the eye of the looper. After the pin *e* enters, and while it is in that part of the slot which is concentric, (from *u* to *w'*,) the needle I remains stationary, and, during this time, the shuttle passes through the loop of the needle-thread, and the sewing-needle is drawn up out of the eye of the needle I, the latter rising again after the pin *e* leaves this concentric portion of the slot. The needle I passes obliquely through the throat of the machine, (a throat-plate, J, having a throat in it to receive both the sewing-needle and the needle I, being substituted for the ordinary throat-plate,) just over and so as to clear the shuttle, and under the rim of the feed-wheel or under the feed-ratchet. The finger E is pivoted at its upper end to the bed-piece B. The general form of this finger is shown in detached views in Figure 1. It is made in two parts hinged together to permit its lower portion to be turned up out of the way when desired, and this lower portion is held in place by the double crank *f* and spring *g*. This crank *f* presses the lower portion of the finger E against the cam-plate *k*, which cam-plate is so formed as to properly guide the finger E as it moves forward, and to bring it in its proper relation to the needle I, when it is thrown clear back. The lower part of the finger E is held in place when turned up by this same crank *f*, the spring *g* then acting on the other side of the dead-point, and the crank *f* bearing against a pin, *t*, in the lower part of the finger E. The cam *m* is acted upon by the pin *e* of the slide C as it ascends, and the lower part of the finger E thus thrown back to its rearmost position, its motion across the axis on which the finger E is pivoted being determined by the shape of the cam-plate *k*. At the same time a bolt, *l*, rides up over the incline *n*—the bolt moving against the spring *i*—and engages with the upper face of the incline *n*, so that, as the cam descends, this bolt *l* slides against the rear face of the incline *n*, and thus throws the finger E forward until the bolt passes the incline, the point of the finger moving past the needle I, and the sewing-needle, as in Fig. 1, (where it remains until the sewing-needle descends,) and, being guided in this movement by the cam-plate *k*. The point of the finger E remains in this position until the cam *w* is struck by the toe-piece V on the needle-bar, which moves the finger E back past the sewing-needle, where it remains until the pin *e* acts upon the cam *m*, as before.

Care should be taken to so set the cam-plate *k* as to properly guide the point of the finger E and bring it in proper position with respect to the needle I and the sewing-needle.

Figure 2:
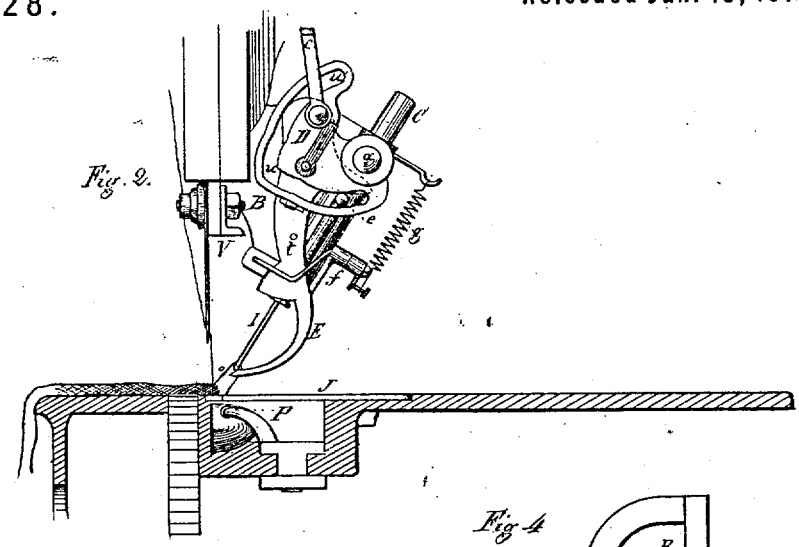

The throat-plate J, as represented in Fig. 5, consists of a single narrow plate, secured to the bed of the machine transversely across the shuttle-race, as shown in Figs. 1 and 2. This plate J is provided with a hole, *p*, at its outer end for the passage of the needle and looper, and with a larger hole at its opposite end for a screw, by which it is secured to the bed of the machine. It has also a small stud or pin, *v*, projecting from its upper face in front of the needle-hole, this pin being intended to enter the slit forming the button-hole and thus serve to hold it open, so as to permit the looper to pass through it, and also to operate as a guide, against which the edge of the fabric rests as it moves along, thus holding the fabric so that it shall not crowd or work over in the way of the looper, and cause the needle to enter the fabric at a uniform distance from the edge.

Figure 4:
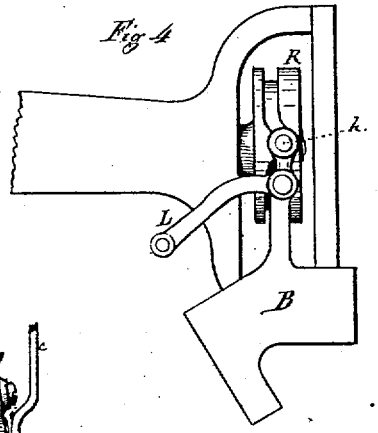
Figure 3:
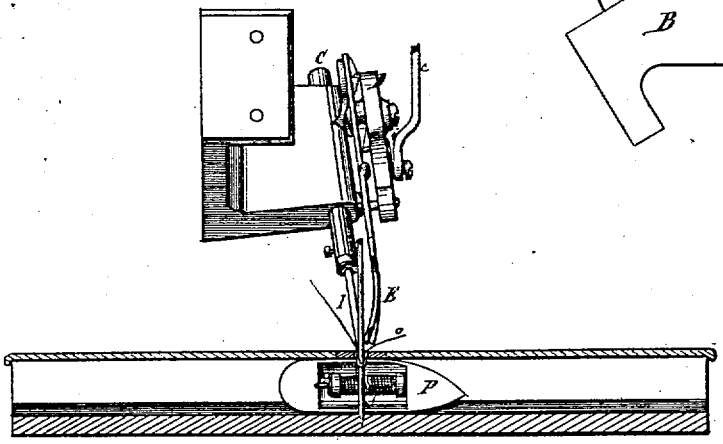

In Figs. 1, 2, and 3 the attachment is represented as applied to that class of machines which has a vibrating needle-arm, but in Fig. 4 it is represented as applied to that class of machines which has a rotating-shaft, instead of the vibrating arm, for operating the needle. In such cases the cam D is dispensed with, and motion is imparted to the looper-slide by means of an elbow-lever, L, pived to an arm of the bracket B, as shown in Fig. 4, the short arm of the lever being provided with a pin, *h*, which engages in a cam-groove on the wheel R, secured to the end of the rotating shaft, the groove being so formed as to give to the lever L, and, consequently, to the looper I, the required movements. In this case, the spring-bolt *l*, which rides over the incline *n* on the finger E, is applied to the connecting-link *c*, and operates the same as when applied to the cam in the other case.

It is obvious that many other plans may be adopted to transmit motion from the needle-arm or rotating shaft to the needle I and finger E; but those described are simple and efficient, and are amply sufficient for an illustration of the principle or mode of operation of our invention.

The shuttle and needle being threaded, as for ordinary sewing, and the throat-plate and attachment being secured in position, the cloth is placed under the foot, with the pin *v* in the slit or button-hole, or against the edge of the fabric, if it be desired to work the edge simply, and the machine is then set in motion. As it starts, the looper I passes obliquely through the slit under the edge of the material, until its eye comes directly under the sewing-needle, which descends and passes through the fabric, and also through the eye of the looper, and down past the shuttle P, or other thread-carrier, as the case may be, this latter passing through the needle-loop in the usual manner. The sewing-needle is then drawn up, and, as it rises out of the eye of the needle I the latter is also drawn back to the position shown in Fig. 2, the thread of the sewing-needle, as it is drawn up through the eye of the needle I, bringing the shuttle-thread *o* with it. At this instant, the lower forked end of the finger E, which has been also brought to the position represented in Fig. 2, engages with that part of the shuttle-thread which is between the needle I and the cloth, and immediately carries it over the upper side of the fabric, thereby forming a loop directly under the sewing-needle, as shown in Fig. 1, so that as the needle descends, it passes through this loop, and thus locks the shuttle-thread at that point. As soon as the needle has fairly entered the loop on top of the cloth, the toe V, on the end of the needle-bar, strikes against the cam *w* of the finger, thereby pushing the latter back to a position directly in rear of the needle and alongside of the looper, where it remains until the looper rises, when it is acted upon by the pin *e*, as before described.

By these means, we produce an attachment that is simpler and better, and that can be applie to all styles of machines, and which need not be removed for ordinary sewing, as it is only necessary to disconnect the link *c* from the driving bar or shaft, slide back the needle I, and then turn up the finger E out of the way, when the machine can be used the same as though the attachment was not there.

What we claim as our invention is—

1. The needle I when constructed as described, and arranged to move from above diagonally across the line of the needle's movement under the fabric and over the lower thread-carrier, substantially as described.

2. The finger E, in combination with the mechanism to give it the forward and backward motions, before described, the whole combination being and operating substantially as described.

3. The guide-plate *k*, in combination with the finger E, the whole being and operating substantially as described.

4. The hinged finger E, in combination with the spring-crank *f*, when so arranged that the finger can be turned up out of the way for plain sewing.

EDMUND HOWARD.
W. H. JACKSON.

Witnesses:
JAMES R. HENRY,
H. W. MABIE.